Patented May 11, 1937

2,080,375

UNITED STATES PATENT OFFICE 2,080,375

FIBROUS COMPOUND OF THERMOPLASTIC RUBBER DERIVATIVES

James A. Merrill, Akron, Ohio, assignor to Wingfoot Corporation, Wilmington, Del., a corporation of Delaware No Drawing. Application May 4, 1934, Serial No. 723,903

2 Claims. (Cl. 106—23)

This invention relates to articles made from a fibrous material and a condensation derivative of rubber. More particularly it relates to the use of emulsions of solutions of such rubber derivatives in the manufacture of molded products.

The preferred method of this invention involves the preparation of an emulsion of a solution of a condensation derivative of rubber, by the use of a solution of a rubber derivative obtained in the course of the manufacture of the condensation derivative, although condensation derivatives of rubber however formed may be brought into solution and the solutions thus obtained utilized in carrying out the process.

According to the preferred method of procedure the reaction mixture obtained by treating a solution of rubber in an organic solvent such as benzene, with a reagent such as a halide of an amphoteric metal or compound thereof, is intimately mixed with fibrous material which has been wet with water. When the condensation derivative of the rubber in solution in the organic solvent is thus applied to the wet fibrous material it impregnates the fibrous material at least to the extent of entering between the fibers. The adhesion between the solution and the fibrous material is such that on filtering, the condensation derivative is entirely, or largely held by the fibrous material and the excess water with little or no condensation derivative passes through the filter. The separation of the excess water from the fibrous mass and condensation rubber derivative may be effected in any suitable manner. For example, the mass where wood fiber is employed may be fed onto a screen such as that used in the manufacture of paper to form a mat or bat. The solvent and remaining water may be vaporized and the fibers and rubber derivative then heated and pressed to form a sheet or panel or object of any desired shape.

The fibrous mass obtained may be pressed and after pressing heated to remove the remaining solvent. The fibrous material may be agitated while part or all of the solvent and water are being evaporated. The fibrous mass may advantageously be shaped somewhat before removing the solvent, and then after removing the solvent it may be brought to the final shape desired by heating and pressing. After removing the water and solvent in any desired manner the resulting mass may be molded with heat and pressure. During the molding operation the condensation derivative of rubber becomes plastic and with pressure further impregnation of the fibers is attained. In any event, by applying the condensation derivative of rubber in solution to the fibers more uniform and thorough distribution of the condensation derivative among the fibers is obtained than would be possible by using the condensation derivative in solid form.

Wood pulp, such as sulfite wood pulp or pulp produced by other processes or pulps made from other materials than wood such as vegetable fibers and fibrous cotton materials such, for example, as the fibers recovered from used automobile tires, etc. may be utilized in carrying out the process. Both the solvent and the amount of solvent employed may be varied with the various fibrous substances utilized in order to control, at least to some extent, the degree of impregnation and to assure adhesion of the solution of the condensation derivative of the rubber to the fibrous material. Organic solvents, such as benzene, chloroform, petroleum distillates, e. g., naphtha, etc. may be utilized where condensation derivatives soluble in such solvents are employed. In general benzene may be considered the most satisfactory solvent for this use.

It appears that the reagents used in producing condensation derivatives of rubber may be divided generally into two classes, one of which includes compounds such as sulfuric acid, which very possibly do not produce any intermediate products, but convert the rubber directly to the condensation derivative; and other products such as the halides of amphoteric metals and compounds thereof which apparently first produce a metal compound which must be further treated to produce the condensation derivative. For example, when a solution of rubber is treated with tin tetrachloride or chlorostannic acid it appears that a compound, probably having the formula $(C_5H_8)_x.SnCl_4$, is first formed and that to obtain the condensation derivative of rubber, this compound must be treated with a substance such as water, acetone or alcohol. If a product of the first class such as sulfuric acid is to be used it is preferable to produce the condensation derivative in solution in a solvent such as benzene and use the reaction mixture directly, after first neutralizing the free acid if necessary, in the manufacture of the fibrous compositions. With compounds of the second class the first step of the reaction is also advantageously carried out in solution in an organic solvent. The reaction mixture which includes the metal-containing compound formed is then used directly, and when mixed with water the metal-containing compound is broken down and the condensation derivative produced.

The water present in the emulsion employed performs one or more useful functions. Organic solvents are, of course, relatively expensive and by mixing with water a smaller amount of the expensive organic solvent may be used to treat an amount of fibrous material, which without the use of water would require a larger amount of solvent. To illustrate, if one were to attempt to wet a large amount of a dry fibrous material with the condensation derivative dissolved in a small amount of solvent it would be difficult to obtain anything like a uniform distribution of the solution over the fibrous material. By first wetting the material with water and then adding a small amount of the condensation derivative, this condensation derivative may be quite uniformly spread over a relatively large amount of the fibrous material.

In the process involving the use of metallic compounds, such as tin tetrachloride, in the manufacture of the condensation derivative of the rubber, the water performs an additional function when the reaction mixture comprising the metal-containing derivative of rubber is mixed with the wet fiber, namely the decomposition of the metal-containing derivative of the rubber and the formation of the condensation derivative.

The process may, for example, be carried out as follows: Pale crepe rubber plasticized to a plasticity of 300 (as determined by a Williams plastometer) is dissolved in sufficient benzene to form a 10% solution. Ten per cent (by weight) of hydrated chlorostannic acid is added to the cement and the mixture heated under a reflux condenser at a temperature at or near the boiling point for several hours. The properties of the condensation derivative obtained will vary, depending upon the extent to which the chlorostannic acid acts upon the rubber. For example, a condensation derivative with a softening point of 50° C. may be obtained, or by longer heating or heating to a higher temperature a harder condensation derivative of rubber may be produced, such for example, as one with a softening point around 100° C. With shorter heating a product with a softening point of about 30° C. may be obtained. When the action of the chlorostannic acid on the rubber has progressed to the point required to produce a condensation derivative of rubber having the desired properties the reaction is terminated by the addition of a small amount of water or sodium hydroxide. This reaction mixture may be used to treat the fibrous material. If desired, the reaction mixture may be poured into considerable water, and the emulsion thus formed may be used to treat the wet fibrous material, and where a sufficiently large amount of water is used it may be mixed with dry fibrous material.

The fibrous material may, for example, be the cotton fibers reclaimed from rubber tires. This fibrous material may be treated with sufficient water to form a thin slurry and the benzene solution resulting from the treatment of the rubber with the chlorostannic acid may be added to the slurry with sufficient agitation or mixing to obtain substantially uniform distribution of the condensation derivative in the fibrous material.

The amount of the condensation derivative of the rubber added to a given quantity of the fibrous material may vary over a considerable range. The final product may contain 10–15% of fibrous material, although more generally 25% or 40% would be employed, and as much as 75–80% or higher may be used. A mixture of substantially equal parts (by weight) of the fibrous material and the condensation derivative of rubber will be satisfactory for many purposes.

For example, 80 pounds of the fibrous material obtained in the reclamation of rubber from old tires may be mixed with 100 gallons of water. The fibrous material and water are thoroughly agitated to form a slurry. To this 30 gallons of the benzene solution of the reaction product of chlorostannic acid on rubber obtained as above described are added with agitation to distribute the rubber derivative substantially homogeneously throughout the mass. The water acts on the metal-containing rubber derivative and produces the condensation derivative which, when prepared by this process, will contain a small amount of combined chlorine. Other condensation derivatives which contain no chlorine but are substantially 100% hydrogen and carbon may be used.

The slurry thus obtained is treated for the removal of water. This may be done by centrifuging or filtering as by passing through the screen or web of a paper machine. In this way a large amount of the water is removed. The product obtained contains some water and volatile solvent which should be recovered in any commercial application of the process. The bat of fibrous material obtained by screening is advantageously heated to remove the solvent and water and then while still warm, with additional heating if necessary, or after first cooling and then after again heating, it is shaped with pressure. For example, the bat of material obtained by screening may be heated to form a dry, loosely-knit panel, which may be sub-divided and then shaped into an object, such as a receptacle, by the application of heat and pressure. The bat from the paper machine while still containing the solvent and moisture may first be shaped to form a blank for insertion in a molding machine and this blank may then be heated to remove solvent and moisture before the final molding operation. Many different varieties of objects of quite different shapes may be made.

The molded articles after the final molding operation are advantageously dipped in chlorine water for a few minutes to prevent the surface from being tacky and to make them oil resistant. Where desirable plasticizers, etc. and filling materials may be added. Rubber, balata, and the like may be added by dissolving in the solution of the condensation derivative before adding to the fibrous materials; or they may be first dissolved in a suitable solvent and then added to the solution of the derivative. Coloring may be added to the condensation derivative by solution or suspension in the reaction mixture, or the fibrous material may be dyed. Both the fibrous material and the condensation derivative may be colored and where desired different colors may be used with each.

A chlorine-containing condensation derivative may be obtained by treating the rubber with a mixture of hydrochloric acid and the halide of an amphoteric metal, instead of using chlorostannic acid. Where a hydrocarbon condensation derivative of rubber is desired tin tetrachloride is advantageously employed by causing it to react on a heated rubber cement. Other halides of amphoteric metals such as iron chloride, chromic chloride, etc. may be used in forming such condensation derivatives of rubber.

I claim:

1. The method of forming fiber-containing products which comprises treating rubber in solution in a volatile solvent with a halide of an amphoteric element and without removing the resulting rubber derivative from solution mixing it with water and fibrous material and thereafter separating the water and volatile solvent and shaping the fibrous mass.

2. The method of forming fiber-containing products which comprises treating rubber in solution in a volatile solvent with chlorostannic acid and without removing the resulting rubber derivative from solution mixing it with water and fibrous material and thereafter separating the water and volatile solvent and shaping the fibrous mass.

JAMES A. MERRILL.